April 9, 1957   J. C. ECK ET AL   2,787,864
APPLICATION OF SOIL CONDITIONERS
Filed Sept. 2, 1953
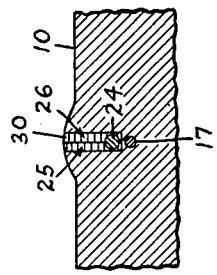
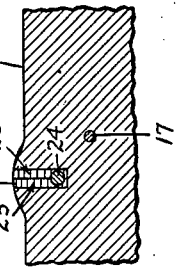
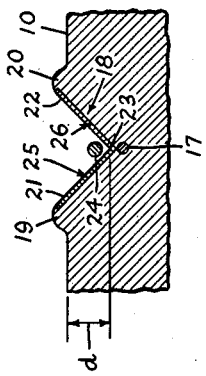
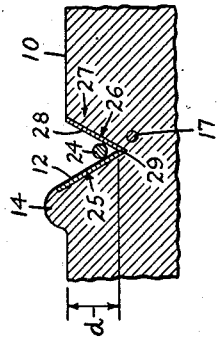
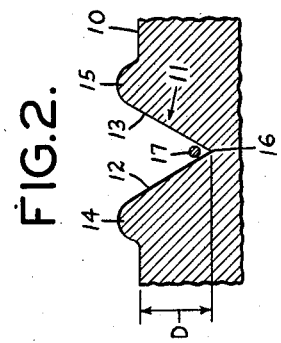
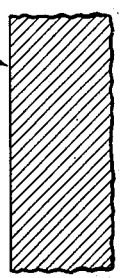
INVENTORS.
JOHN C. ECK
ELMER C. PERRINE
BY
ATTORNEY.

2,787,864

APPLICATION OF SOIL CONDITIONERS

John C. Eck, Convent, N. J., and Elmer C. Perrine, Philadelphia, Pa., assignors to Allied Chemical & Dye Corporation, New York, N. Y., a corporation of New York Application September 2, 1953, Serial No. 378,124

6 Claims. (Cl. 47—58)

This invention relates to methods of conditioning soils which improve the physical structure and tilth of the soil. It is particularly directed to methods of applying conditioners to the soil to obtain maximum effectiveness with very low quantities of conditioner.

It has been found that soils of poor structure are characterized by inadequate particulate aggregation. Such soils are of poor tilth, low capillarity, low absorptivity, and have very low resistance to erosive forces such as raindrop impact or flow of water thereover. Plant growth in soils of poor structure, which may be characterized as crusting or caking soils, is hindered by their compactness and density and, because their low porosity prevents proper passage, retention and availability of moisture and air. In addition, because of these characteristics, nutrients in such soils are not fully available for assimilation by the growing plants. Caking soils possess such undesirable characteristics from the surface down to the depth reached by desired plants and thus retard otherwise normal rate of development and growth of the plant toward and through the surface. In crusting soils seedlings from seeds planted below the crust have difficulty in emerging and, if planted within the crust, are retarded or arrested substantially as if within caking soil. In either case, soil characteristics result in low crop yields regardless of whether or not essential nutrient elements are present in the soil.

Tilling of such soils and addition of humus thereto having been unsuccessful in affording complete relief from the undesired physical characteristics of the soil, it has been proposed to effect conditioning of soils by addition thereto of certain relatively costly polymeric substances. These materials may be applied either in solid form or as dissolved or dispersed in aqueous medium by known methods such as sprinkling or broadcasting on the soil surface, preferably before working of the soil, as by plowing, disking and the like, particularly when the conditioner is applied as a dry solid. It has been found that when soils are to be conditioned in this manner, in order to obtain proper distribution and concentration of conditioning agents, relatively high dosages or quantities of conditioner based on area treated have been necessary. Thus, dosages of as much as or more than 800 pounds per acre have been prescribed. Although beneficial results have been obtained, the cost of such treatments makes them an expensive and frequently economically unsound measure in the raising of crops for market, even when application of the conditioner has been limited to bands of soil lying over and immediately adjacent the planted rows. Although application in bands reduces the cost of conditioning the soil of a given plot, practical considerations have made it necessary that the bands extend for a substantial distance on either side of the seed row, with resultant wastage of costly chemical as aid to plant development and growth.

Band application of aqueous liquid is subject to all the disadvantages of surface application, including inadequate penetration and frequently absolute failure of the conditioner to penetrate the soil to seed level. Evaporation of the water content of the conditioner from the soil surface, often a rapid process, acts cumulatively with the characteristics of caked or crusted soil to prevent its proper penetration and conditioning. Dry conditioners deposited onto soil surface will penetrate only to the extent worked in mechanically, with the possible exception of slight penetration of water-soluble material which may be effected by simultaneous application of water or by later rainfall. Hence, surface application of such conditioners to seeded plots has not been considered to be of practical value.

It is one object of this invention to improve the effect of conditioning agents when applied to seeded soils. It is a further object selectively to place conditioning agents only on the portions of soil which are in contact with seeds and growing plants. It is a further object to make improvement of the tilth of soils by application of soil conditioning chemicals an economical, feasible measure in the production of crops.

This invention comprises in certain of its aspects a method of application of soil conditioners in which a seed furrow is prepared. Seeds are positioned in the furrow at desired depth and spacing and a suitable polymeric soil conditioning agent, preferably in liquid medium, is distributed as spray or stream over substantially all the vertical extent of the surface of at least one, and preferably of both faces, of the furrow before, in conjunction with, or after the seed placement. The furrow is then closed by effecting lateral displacement of the faces thereof to provide a volume of conditioned soil extending as a thin strip from seed depth to soil surface. Thus, the upper portion of the plant produced by the seed encounters, during its pre-emergence growth, only the desirable, relatively non-resistant structure of conditioned soil. When, as is preferred practice, the soil conditioner is applied as or within an aqueous liquid, absorption of the liquid by soil beside and somewhat below the seed line provides a conditioned environment favorable to growth and development of root structures.

In certain of its other aspects, the invention comprises application of both fertilizer and soil conditioning media in conjunction with planting of seeds in which a furrow is prepared of suitable depth for deposition therein of fertilizer below desired seed depth. A suitable fertilizing medium, for example as solid or liquid, is laid in the bottom of the furrow and is thereafter covered by effecting displacement of part of one or both of the furrow faces to leave a more shallow seed furrow, the thalweg of which is directly above or to one side of and above the thalweg of the fertilizer furrow. In any desired order seeds are laid in and conditioning medium applied to either or both faces of the shallow furrow which is then closed in the manner hereinbefore described.

In effecting simultaneous soil conditioning and fertilizing in accordance with preferred practice of the invention, the fertilizing medium is placed where its nutrient value will be available to the root system of the plants during their early development but is separated from the seed by earth to avoid burning of the latter during germination and earliest growth. Additionally, the soil conditioner, after closure of the furrow, provides a path of conditioned soil for growth of the upper plant portions during their pre-emergence development. If the conditioner is applied as liquid, for example as an aqueous spray, a portion of the spray liquid will penetrate below and laterally from seed level and aid root development toward the nutrient material.

The attached drawing represents a schematic showing of one particular application of soil conditioner during planting in accordance with this invention. In particular, Figures 1 through 4 represent cross-sections of the soil showing results of one sequence of operations. Figures 3a and 4a represent cross-sections of the soil showing results of an alternative sequence of operations.

Figure 1 of the drawing shows the untouched surface 10 of an unconditioned portion of soil which may be characterized by caking or crusting. For purpose of illustration, it will be assumed that the soil is also deficient in nutrient value and that a fertilizer is to be added thereto. However, the fertilizer step may be omitted. It will be understood that all the steps from opening to closing the furrow may be effected substantially simultaneously or seriatim and with several assemblies or by a single tractor-drawn assembly.

In the first step of treating the soil according to this invention as shown in Figure 2 of the drawing, the soil may be furrowed by suitable method to a depth "D" generally somewhat greater than that required for seeding. The depth "D" may vary, depending on the nature of the seed to be planted. When planting grains or legumes it may be less than one inch and for corn or other field crops the fertilizer furrow thus prepared may be of the order of 4 to 7 inches, say 5 to 6 inches, e. g. 5.5 inches deep. The furrow may be prepared for different crops by use of different types of equipment. When planting e. g. grains or legumes, the very shallow furrow required may be prepared for example by means of a two-section combination spring-tooth harrow followed by smoothing teeth. For use with truck garden or field crops, the latter being typified by corn, the furrow may be formed by use of a standard plough which may be a soft center steel bottom plough or a high-speed slat bottom, having soft center slats and a soft center share, both of which are especially adapted for use in clayey soils which need conditioning. Alternatively, a stub-runner furrow opener, or a single- or double-disk furrow opener may be employed, depending on the precise nature of the soil. Other particular pieces of equipment to effect the desired results may also be employed as will be apparent to those skilled in the art.

The deep fertilizer furrow 11 (i. e. deeper than otherwise needed for planting the seed alone) has faces 12 and 13 and the dirt thrown aside by the plough in production of the furrow may rest on the adjoining surface 10 in the form of piles 14 and 15. The thalweg or line forming the lowest portion of the furrow is designated 16. Solid, liquid, or gaseous fertilizer, or a mixture thereof, may be deposited within the lower portion of the furrow 11 and preferably along the thalweg thereof. The line of fertilization will be generally at the depth "D" which is slightly deeper, say up to two inches depending on the crop to be planted, than the level at which the seeds will desirably be introduced. Fertilizer generally designated 17 in the drawing is preferably placed generally along the thalweg 16.

It has been found that it is not usually necessary to apply conditioning media to the soil beneath the seed to be planted, and that more effective disposition of this material is obtained when it is applied at and above seed level. However, when farming in soils which are extremely hard and caking, it may prove to be desirable also to incorporate conditioner into the soil beneath the seed. Under these conditions it may be applied to the area also occupied by fertilizer.

Crusted or caked soils have little or no available water present to assist in ultimate utilization of the fertilizer or conditioner. Accordingly, it is preferred to employ the easily handled liquid conditioners to provide water and a continuum through which conditioning values may be effectively transmitted.

When planting a crop such as carrots, radishes, potatoes or other crops (where the subsurface plant is generally integral and/or arranged closely to a central vertical axis) whose roots go down straight, it is desirable to focus fertilizing of the soil immediately under the seed. With a crop of this nature, the deep fertilizer furrow 11 will be closed in part as by two floating coverers each of which forces a portion of piles 14 and 15 into the furrow to cover the fertilizer 17, and to form a new seed furrow designated 18 of depth "d" less than "D." "d" may be from 1 to 4 inches, say 2 to 3, e. g. 2.5 inches less than "D." Seed furrow 18 has two piles of dirt 19 and 20 resting on surface 10, and faces 21 and 22, generally more flat and exposed than faces 12 and 13 of furrow 11. The thalweg 23 of furrow 18 is generally above the line of thalweg 16 of furrow 11, and, as shown in Figure 3, is above fertilizer 17.

Upon completion of preferred fertilization and/or optional sub-seed line conditioning as indicated, seed 24 may be deposited either continuously or intermittently by any standard seeding or planting mechanism which will place seed generally along thalweg 23 of seed furrow 18. The seeding step may be accomplished in any of the known patterns including check planting. As shown in Figures 3 and 4, the seed 24 as situated in the soil is immediately above fertilizer 17 and thus the downwardly directed root of carrots, for example, may readily contact and fully utilize the fertilizer placed below the seed.

When planting a seed such as corn where the subsurface root growth tends to be generally sideways, i. e. generally radially outwardly and downwardly from the seed rather than straight downwardly, it is desirable to modify the sequence of operations somewhat in order to compensate for this factor. The desirable sequence of events is set forth in Figures 1, 2, 3a and 4a of the drawing, Figures 1 and 2 being common to both this sequence and that hereinabove discussed, including steps shown in Figures 1, 2, 3 and 4.

In order to plant and grow corn more effectively than by the method of Figures 1, 2, 3 and 4, the fertilizer furrow 11 of Figure 2 is filled in on one side only as shown in Figure 3a. Thus, pile of dirt 15 may be forced into the furrow 11 by a coverer passing over one side of furrow to cover face 13, and to form a new seed furrow generally designated 27 having the old face 12 in common with fertilizer furrow 11 and a new face 28 more or less parallel to face 13 of the fertilizer furrow. New seed furrow 27 is generally more shallow than furrow 11 having new shallow depth "d" of from 1 to 4 inches, say 2 to 3 inches.

Thalweg 29 of Figure 3a, in addition to being above the line of fertilization 17 (and in this respect similar to thalweg 23 of Figure 3) is laterally displaced from the vertical plane passing through fertilizer line 17. Displacement may be as much as three or four inches, say two inches. Accordingly, the fertilizer is directly within the expected line of growth of at least a portion of the root structure of the e. g. corn plant, and in this manner insured utilization by the plant of the deposited fertilizer is established.

Subsequent or prior to deposition of seed in either case, conditioning media may be applied to the seed furrow. Although solid conditioner may be employed, to be distributed from a suitable dust applicator entirely over either or both faces 12 and 28, it is preferred to employ conditioner in liquid form for ease of application and distribution as well as for the utilization of water content to assist penetration into the soil. Liquid conditioner may be conveniently applied e. g. in the form of a flat or other suitably shaped spray nozzle held within or slightly above and moved lengthwise of the furrow to be applied continuously to faces 21 and 22 of furrow 18 of Figure 3 or correspondingly over the faces 12 and 28 of furrow 27 of Figure 3a and to contact seeds 24, if present. The applied soil conditioner either as solid or liquid will occupy a thin preferably continuous layer on the face or faces of the furrow as indicated by 25 and 26 in Figures 3 and 3a.

Once the conditioning medium has been selectively placed in the predetermined location within the furrow, one or a pair of coverers, depending on whether the procedure of Figure 3 or 3a is employed, may be passed over the pile or ridge of dirt 14 or the piles 19 and 20 to close up the furrow. Because of the predetermined selective placement of the conditioner, the conditioned soil is forced generally into the volume between the seed and the surface, indicated diagrammatically by 25—26 in Figures 4 and 4a. The soil may be packed down somewhat to form slight ridges 30 by rolling with open center ground wheels which may also be employed to close the furrows, if desired. Although this particular method of furrow closure is suitable e. g. for corn, when planting and conditioning a field with grains or legumes it may suffice to close the shallow furrows by drawing e. g. a drag chain thereover.

As typical of the method of application set forth in this invention, soil in which corn was to be grown was treated with soil conditioner containing as active material the emulsion resulting from emulsion polymerization of butadiene at 50° C. for 18 hours in the presence of an aqueous solution of sodium persulfate containing dodecyl mercaptan and sodium lauryl sulfate. This conditioner, containing 0.5% by weight of the active ingredient, was sprayed through a tractor mounted flat nozzle disposed above planted furrows and moved at speed of one mile per hour. Spraying was directed into the furrows to contact and wet each face thereof at the rate of 0.75 gallon per hundred feet of furrow. This rate was equivalent to 5.84 pounds of active material per acre containing rows at 28" spacing. The furrows were then closed.

For purposes of comparison, the same rate of spray was used for direct surface application in bands of about 2–4 inches in width over corn planted and closed furrows. Other planted and closed furrows received no conditioning treatment. The plantings were made in the same plot of crusting soil.

After a week about 10% of the seeds within the untreated furrows had developed emergent plants. Where the furrows had been surface sprayed after planting and closure, approximately 42.5% of the seeds had developed emergent plants. When the faces of the planted and open furrows had been sprayed directly, the emergent plants represented approximately 85% of the seed planted.

The soil conditioner employed in the foregoing example is one of a number of liquid substances eminently suited for practice of the invention, latices of water-insoluble, non-electrolyte polymers which, on coagulation, form elastic, sticky, cohesive, rubber-like masses.

Preferred among such latices are those of butalastics, including typically homopolymers of isoprene and chloroprene and copolymers of these substances, and/or of butadiene with other ethylenically unsaturated compounds, for example vinyl chloride, vinyl acetate, styrene, acrylonitrile, methyl acrylate, etc. Other suitable liquid conditioners include solutions or dispersions of water-soluble polyelectrolytes, for example copolymers of vinyl acetate and maleic anhydride and esters of such copolymers, hydrolyzed polyacrylonitrile, sodium polyacrylate-vinyl alcohol copolymers. Typical of the solid soil conditioners which may be used include water-soluble polyelectrolytes, for example the copolymeric compounds of the type mentioned above, with or without dilution or extension by suitable free-flowing solids.

In practice of the invention, rates of application of conditioner lower than that indicated in the foregoing example are often efficacious and result in greater incidence of emergence of plants than larger quantities of conditioner applied to the surface after planting even as narrow bands of liquid. In many instances results comparable to those of the example may be realized with as little as half of the quantity of conditioner specified therein. With regard to quantity of soil conditioner applied, due regard will be had to the character of the soil, considering its clayey nature, denseness, and whether it be of a caking or crusting nature, if either. Generally speaking, the more dense soils require relatively large quantities of conditioner as do caking soils as compared with those of crusting nature. Another factor to be considered is the depth of planting and, accordingly, the vertically extending dimensions of the furrows.

The particular conditioning medium, when in preferred aqueous liquid form, may vary between wide limits in terms of concentration of active polymeric ingredient, depending upon the dryness of the soil at time of application and other factors attendant upon application, including characteristics of equipment for its distribution as related to the speed with which such equipment is moved along the furrows. In practice, the polymeric substances, for example emulsions of elastomer-forming homopolymers and copolymers, will normally be 0.1 to 2.0% by weight of the aqueous medium as applied. Higher and lower concentrations may be used, however, when conditions of application indicate their advisability.

We claim:

1. The method of treating soils to improve their plant growth and environmental characteristics during growth of seedlings prior to emergence thereof through the surface of the soil which comprises forming a fertilizer furrow for deposition therein of fertilizer and having a pair of faces meeting along the thalweg of said furrow, positioning fertilizing medium in said furrow according to prearranged plan along a line of fertilization, displacing at least one face of said open fertilizer furrow into the said fertilizer furrow, thereby forming a seed furrow which is generally less deep than said fertilizer furrow, in any order positioning seeds according to a prearranged spacing pattern along a seed line above said line of fertilization and distributing polymeric conditioning medium over substantially all the surface of at least one of the faces of said seed furrow, and displacing the conditioned faces of said furrow into a volume immediately between the seed line and the surface of the soil whereby the growing seedling having its genesis in the seed may pass only through conditioned soil on its path of the surface of the soil.

2. The method of treating soils to improve their plant growth and environmental characteristics during growth of seedlings and emergence thereof through the surface of the soil as claimed in claim 1 wherein only one side of the fertilizer furrow is displaced in forming said seed furrow, whereby said seed line is above and laterally displaced from said line of fertilization.

3. The method of conditioning soils to improve their plant growth and environmental characteristics during growth of seedlings and emergence thereof through the surface of the soil as claimed in claim 1 wherein both faces of said fertilizer furrow are displaced into said furrow, whereby the subsequently formed seed line is immediately above said line of fertilization.

4. The method of fertilizing and planting seed rows and of conditioning soil therein comprising preparing a furrow adapted to receive fertilizer, depositing fertilizer therein, displacing soil from a side of the furrow to cover said fertilizer and to form a seed furrow, in any order placing seed in said seed furrow and spraying a polymeric soil conditioner in liquid medium over substantially the entire vertical extent of at least one face of the seed furrow in amount adequate to wet said face and to penetrate soil thereon and in the thalweg thereof, and laterally displacing the faces of said seed furrow toward one another to provide a planted and covered seed row, having only conditioned soil extending from the seeds to the soil surface in the path of preemergent plant growth.

5. The method of treating soils to improve their plant growth and environmental characteristics during growth of seedlings prior to emergence thereof through the surface of the soil which comprises forming in the surface of said soil a seed furrow of suitable depth for deposition therein of seed, said furrow having a pair of faces meeting along the thalweg of said furrow, in any order positioning seed in said furrow along a seed line according to a prearranged spacing pattern and placing a polymeric soil conditioner in liquid medium on substantially the entire area of at least one of the faces of said seed furrow, and effecting displacement of the faces of the furrow and the conditioned soil thereon into a volume immediately between the seed line and the surface of the soil whereby the growing seedling having its genesis in the seed may pass through only conditioned soil during its preemergent growth 6. The method of treating soils to improve their plant growth and environmental characteristics during growth of seedlings prior to emergence thereof through the surface of the soil which comprises forming in the surface of said soil a seed furrow of suitable depth for deposition therein of seed, said furrow having a pair of faces meeting along the thalweg of said furrow, in any order positioning seed in said furrow along a seed line according to a prearranged spacing pattern and placing a polymeric soil conditioning medium comprising a latex of a water-insoluble, non-electrolyte polymer which on coagulation forms an elastic, sticky, cohesive, rubber-like mass on substantially the entire area of at least one of the faces of said seed furrow, and effecting displacement of the faces of the furrow and the conditioned soil thereon into a volume immediately between the seed line and the surface of the soil whereby the growing seedling having its genesis in the seed may pass through only conditioned soil during its preemergent growth.

References Cited in the file of this patent

UNITED STATES PATENTS

| 1,882,377 | Whittelsey | Oct. 11, 1932 |
| 1,906,351 | White | May 2, 1933 |
| 2,175,356 | Maly | Oct. 10, 1939 |
| 2,582,194 | Dudley | Jan. 8, 1952 |
| 2,625,529 | Hedrick et al. | Jan. 13, 1953 |
| 2,672,260 | Rodkey | Mar. 16, 1954 |

FOREIGN PATENTS

| 411,180 | Germany | Mar. 16, 1925 |